(12) United States Patent
Kobayashi (10) Patent No.: US 11,705,282 B2
(45) Date of Patent: Jul. 18, 2023

(54) ELECTRONIC COMPONENT

(71) Applicant: Murata Manufacturing Co., Ltd., Nagaokakyo (JP)

(72) Inventor: Haruki Kobayashi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/367,729

(22) Filed: Jul. 6, 2021

(65) Prior Publication Data

US 2022/0013297 A1 Jan. 13, 2022

(30) Foreign Application Priority Data

Jul. 10, 2020 (JP) ................................ 2020-119239

(51) Int. Cl.
| | |
|---|---|
| *H01G 4/30* | (2006.01) |
| *H01G 4/012* | (2006.01) |
| *H01G 4/008* | (2006.01) |
| *H01G 4/232* | (2006.01) |
| *C04B 35/48* | (2006.01) |

(52) U.S. Cl.
CPC ............ *H01G 4/30* (2013.01); *H01G 4/0085* (2013.01); *H01G 4/012* (2013.01); *H01G 4/2325* (2013.01); *C04B 35/48* (2013.01)

(58) Field of Classification Search
CPC ......... H01G 4/224; H01G 4/232; H01G 4/228
See application file for complete search history.

(56) References Cited

U.S. PATENT DOCUMENTS

| | | | |
|---|---|---|---|
| 2009/0046410 A1 | 2/2009 | Takeoka | |
| 2012/0300361 A1* | 11/2012 | Togashi | H01G 4/12 156/89.12 |
| 2014/0182910 A1* | 7/2014 | Ahn | H01G 2/06 361/321.2 |
| 2014/0311783 A1* | 10/2014 | Lee | H01G 4/005 361/321.2 |
| 2014/0367152 A1* | 12/2014 | Lee | H01G 4/232 361/301.4 |
| 2016/0126012 A1* | 5/2016 | Kim | H01G 4/232 156/89.12 |
| 2019/0066925 A1* | 2/2019 | Satoh | H01G 4/248 |
| 2019/0189352 A1* | 6/2019 | Yamato | H01G 4/005 |
| 2020/0035416 A1* | 1/2020 | Kwon | H01G 4/30 |

FOREIGN PATENT DOCUMENTS

JP 2009-007209 A 1/2009

* cited by examiner

*Primary Examiner* — Eric W Thomas
(74) *Attorney, Agent, or Firm* — Keating & Bennett, LLP (57) ABSTRACT

A multilayer ceramic capacitor includes a multilayer body including dielectric layers and internal electrode layers laminated alternately on each other, and external electrode layers provided on opposing end surfaces of the multilayer body in a length direction orthogonal or substantially orthogonal to a lamination direction, and each connected with the internal electrode layers, in which the dielectric layers each include at least one of Ca, Zr, or Ti, the internal electrode layers each include Cu, and when a dimension in the lamination direction of the multilayer body is defined as T0, a dimension in the length direction of the multilayer body is defined as L0, and a dimension in a width direction orthogonal or substantially orthogonal to the lamination direction and the length direction is defined as W0, a relationship of L0<W0<T0 is satisfied.

19 Claims, 10 Drawing Sheets

ELECTRONIC COMPONENT

CROSS REFERENCE TO RELATED APPLICATIONS

This application is based on and claims the benefit of priority from Japanese Patent Application 2020-119239, filed on Jul. 10, 2020, the entire contents of which are incorporated herein by reference.

BACKGROUND OF THE INVENTION

1. Field of the Invention

The present invention relates to an electronic component.

2. Description of the Related Art

Examples of an electronic component, such as a multilayer ceramic capacitor, include an electronic component having a high dielectric constant with a large capacitance and an electronic component for temperature compensation capacitance in which the rate of change in capacitance due to temperature is small. In such an electronic component for temperature compensation, dielectric layers including at least one of Ca, Zr, or Ti are generally used as a dielectric (refer to Japanese Unexamined Patent Application Publication No. 2009-7209).

In such an electronic component for temperature compensation, in particular, it is preferable that the equivalent series resistance (ESR) and the equivalent series inductance (ESL) are small.

SUMMARY OF THE INVENTION

Preferred embodiments of the present invention provide electronic components each including a dielectric including at least one of Ca, Zr, or Ti, and able to reduce the equivalent series resistance and the equivalent series inductance.

A preferred embodiment of the present invention provides an electronic component including a multilayer body including dielectric layers and internal electrode layers laminated alternately on each other, and external electrode layers provided on opposing end surfaces of the multilayer body in a length direction orthogonal or substantially orthogonal to a lamination direction. Each of the external electrode layers is connected with the internal electrode layers. The dielectric layers each include at least one of Ca, Zr, or Ti, and the internal electrode layers each include Cu. When a dimension in the lamination direction of the multilayer body is defined as T0, a dimension in the length direction of the multilayer body is defined as L0, and a dimension in a width direction orthogonal or substantially orthogonal to the lamination direction and the length direction is defined as W0, a relationship of L0<W0<T0 is satisfied.

According to preferred embodiments of the present invention, electronic components each including a dielectric including at least one of Ca, Zr, or Ti, and able to reduce the equivalent series resistance and the equivalent series inductance, are provided.

The above and other elements, features, steps, characteristics, and advantages of the present invention will become more apparent from the following detailed description of the preferred embodiments with reference to the attached drawings.

DETAILED DESCRIPTION OF THE PREFERRED EMBODIMENTS

In the following, a description will be provided of an exemplary multilayer ceramic capacitor 1 as an electronic component according to a preferred embodiment of the present invention. A multilayer ceramic capacitor 1 of the present preferred embodiment provides a capacitor for temperature compensation for use in the matching, etc., of the high-frequency circuit and the filter since the rate of change in capacitance due to temperature change is small.

Figure 1:
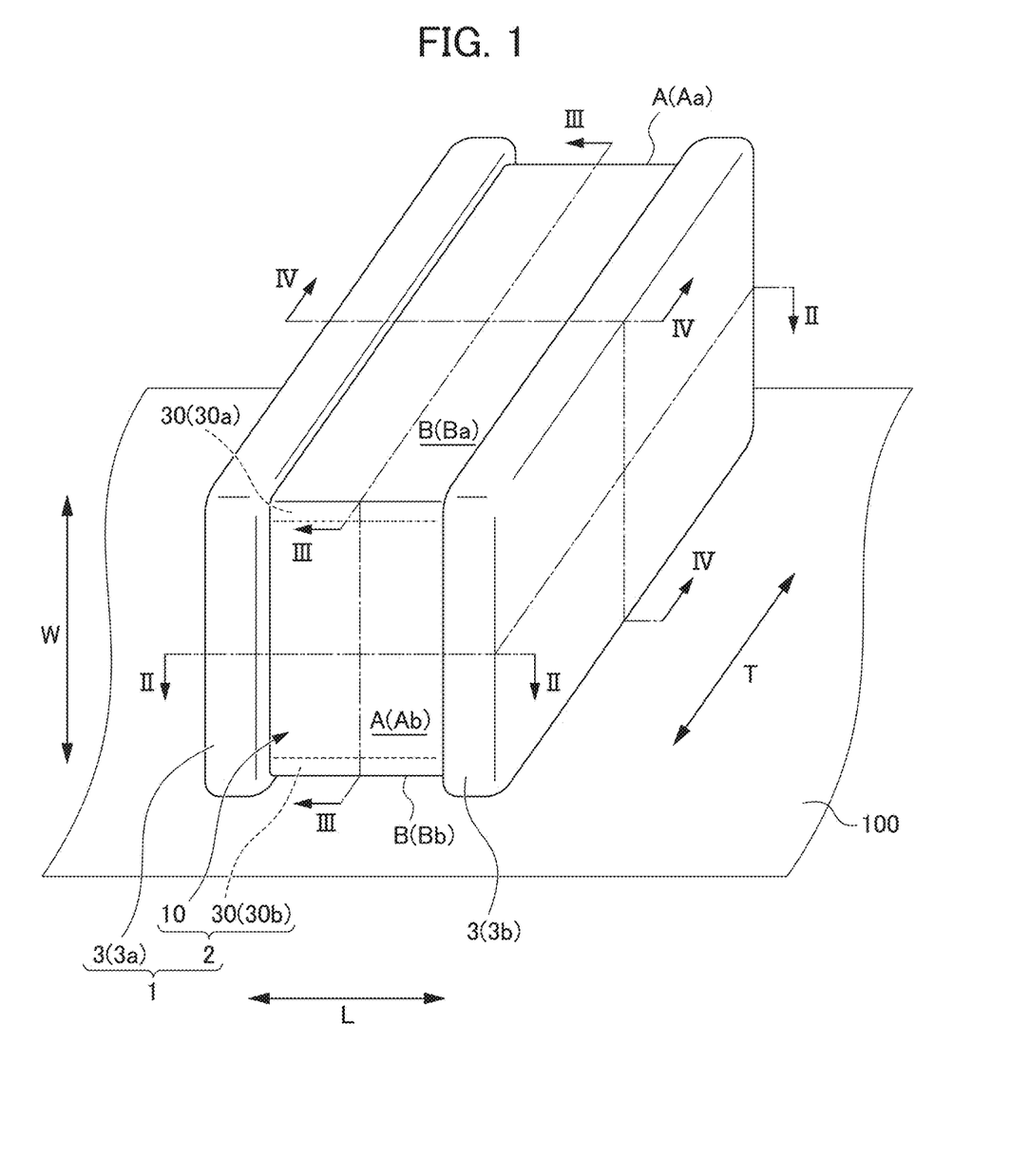
FIG. 1 is a perspective view of a multilayer ceramic capacitor, and shows the multilayer ceramic capacitor mounted on a substrate.
Figure 2A:
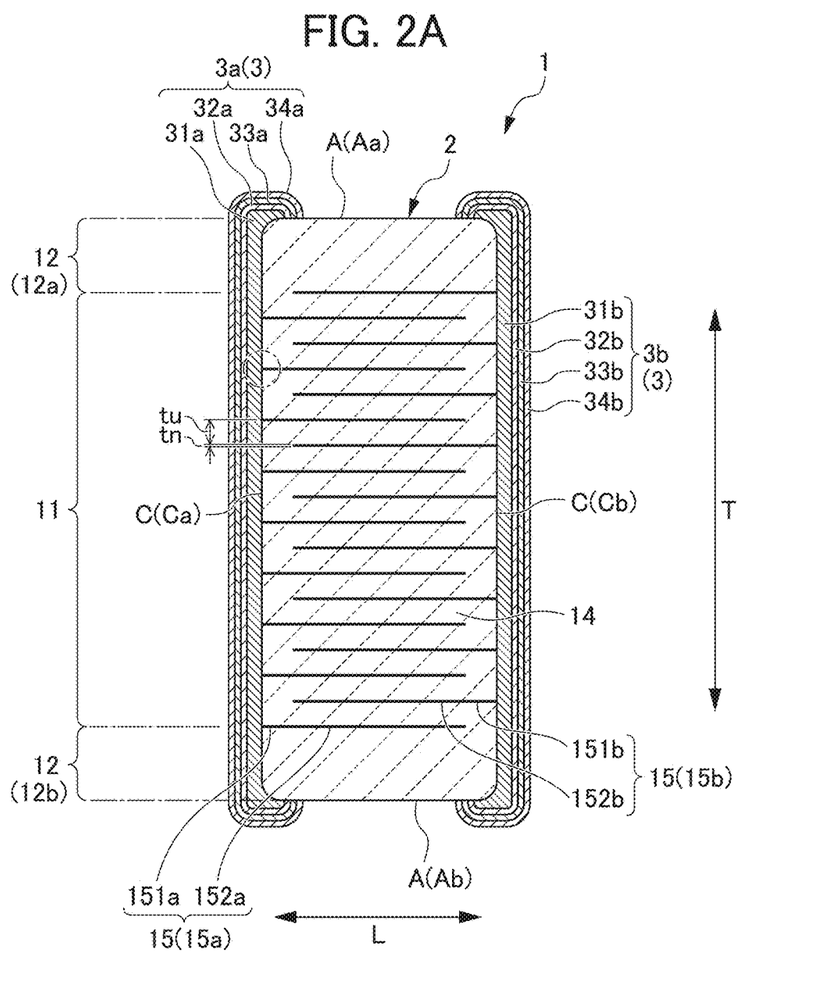
FIG. 2A is a cross-sectional view of the multilayer ceramic capacitor 1 of FIG. 1 taken along the line II-II.
Figure 2B:
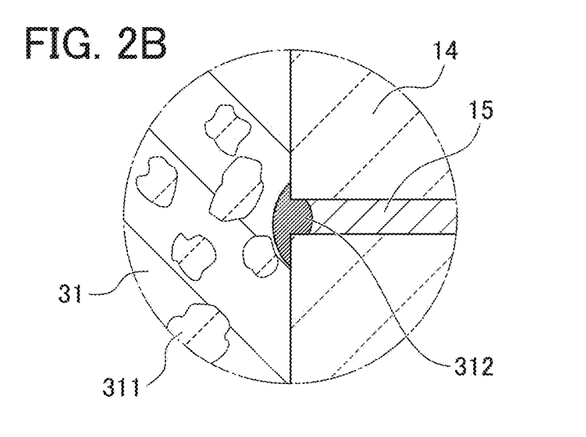
FIG. 2B is an enlarged view of a portion surrounded by a circle in FIG. 2A.
Figure 3A:
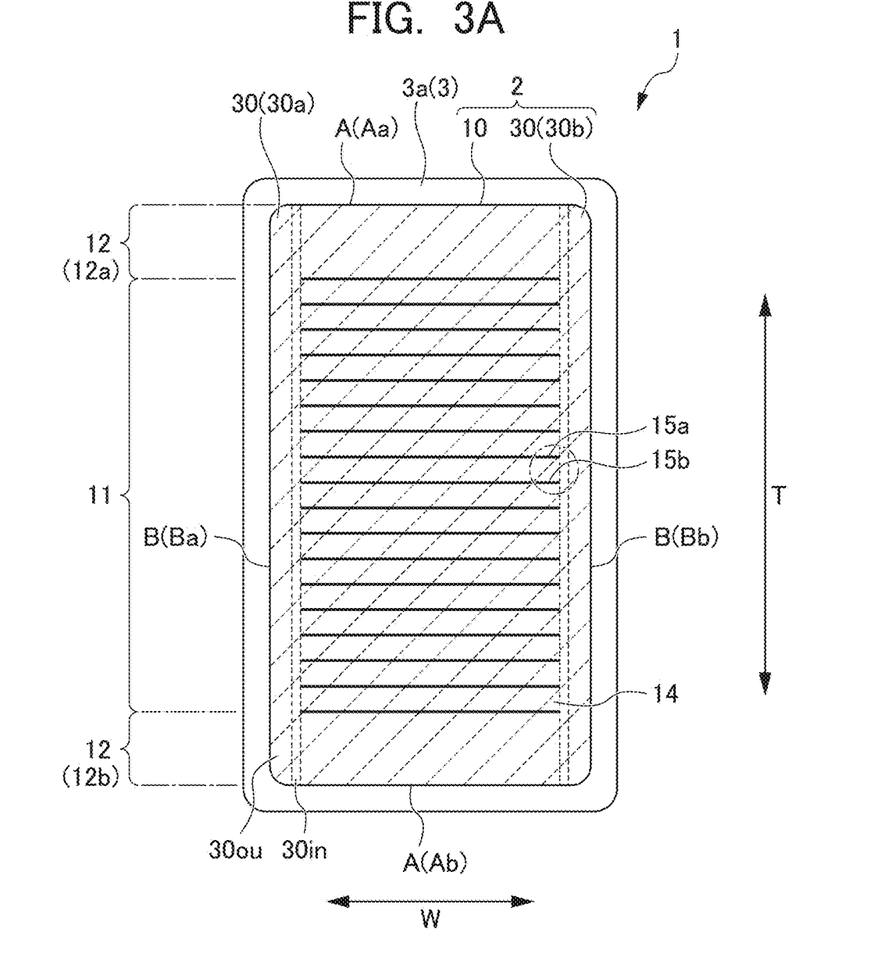
FIG. 3A is a cross-sectional view of the multilayer ceramic capacitor 1 of FIG. 1 taken along the line and FIG. 3B is an enlarged view of a portion surrounded by a circle in FIG. 3A.
Figure 3B:
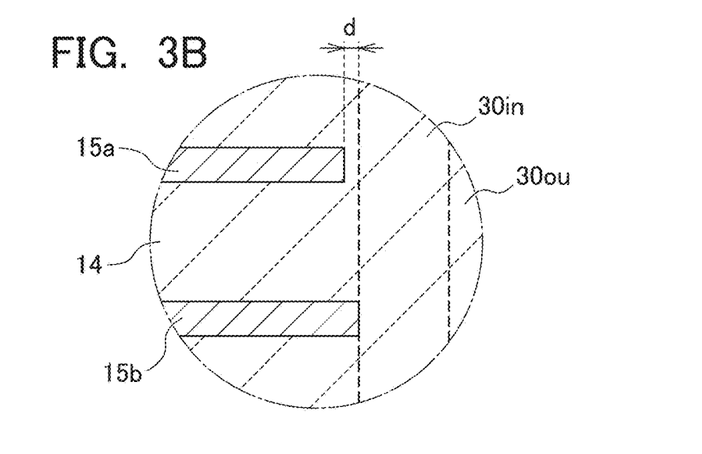
Figure 4:
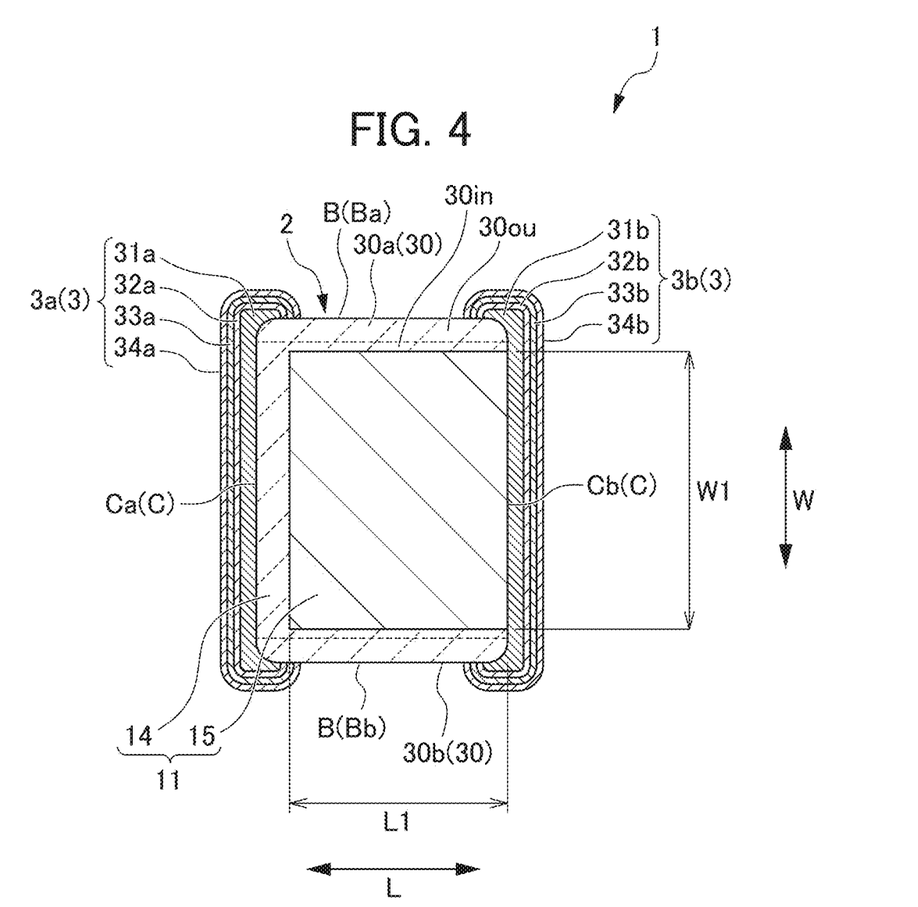
FIG. 4 is a cross-sectional view of the multilayer ceramic capacitor 1 of FIG. 1 taken along the line IV-IV.

FIG. 1 is a perspective view of the multilayer ceramic capacitor 1, and shows the multilayer ceramic capacitor 1 mounted on a substrate 100. FIG. 2A is a cross-sectional view of the multilayer ceramic capacitor 1 of FIG. 1 taken along the line II-II, and FIG. 2B is an enlarged view of a portion surrounded by a circle of FIG. 2A. FIG. 3A is a cross-sectional view of the multilayer ceramic capacitor 1 of FIG. 1 taken along the line III-III, and FIG. 3B is an enlarged view of a portion surrounded by a circle of FIG. 3A. FIG. 4 is a cross-sectional view of the multilayer ceramic capacitor 1 of FIG. 1 taken along the line IV-IV.

The multilayer ceramic capacitor 1 has a rectangular or substantially rectangular parallelepiped shape, and includes a multilayer body 2, and a pair of external electrode layers 3 provided on both ends of the multilayer body 2. Furthermore, the multilayer body 2 includes an inner layer portion 11 including a plurality of sets of the dielectric layers 14 and the internal electrode layers 15.

In the following description, as a term representing the orientation of the multilayer ceramic capacitor 1, the length direction L indicates the direction in which the pair of external electrode layers 3 are provided in the multilayer ceramic capacitor 1. The lamination (stacking) direction T indicates the direction in which the dielectric layers 14 and the internal electrode layers 15 are laminated (stacked). The width direction W indicates a direction intersecting both the length direction L and the lamination direction T. In the present preferred embodiment, the width direction W, the length direction L, and the lamination direction T are orthogonal or substantially orthogonal to one another.

Figure 5:
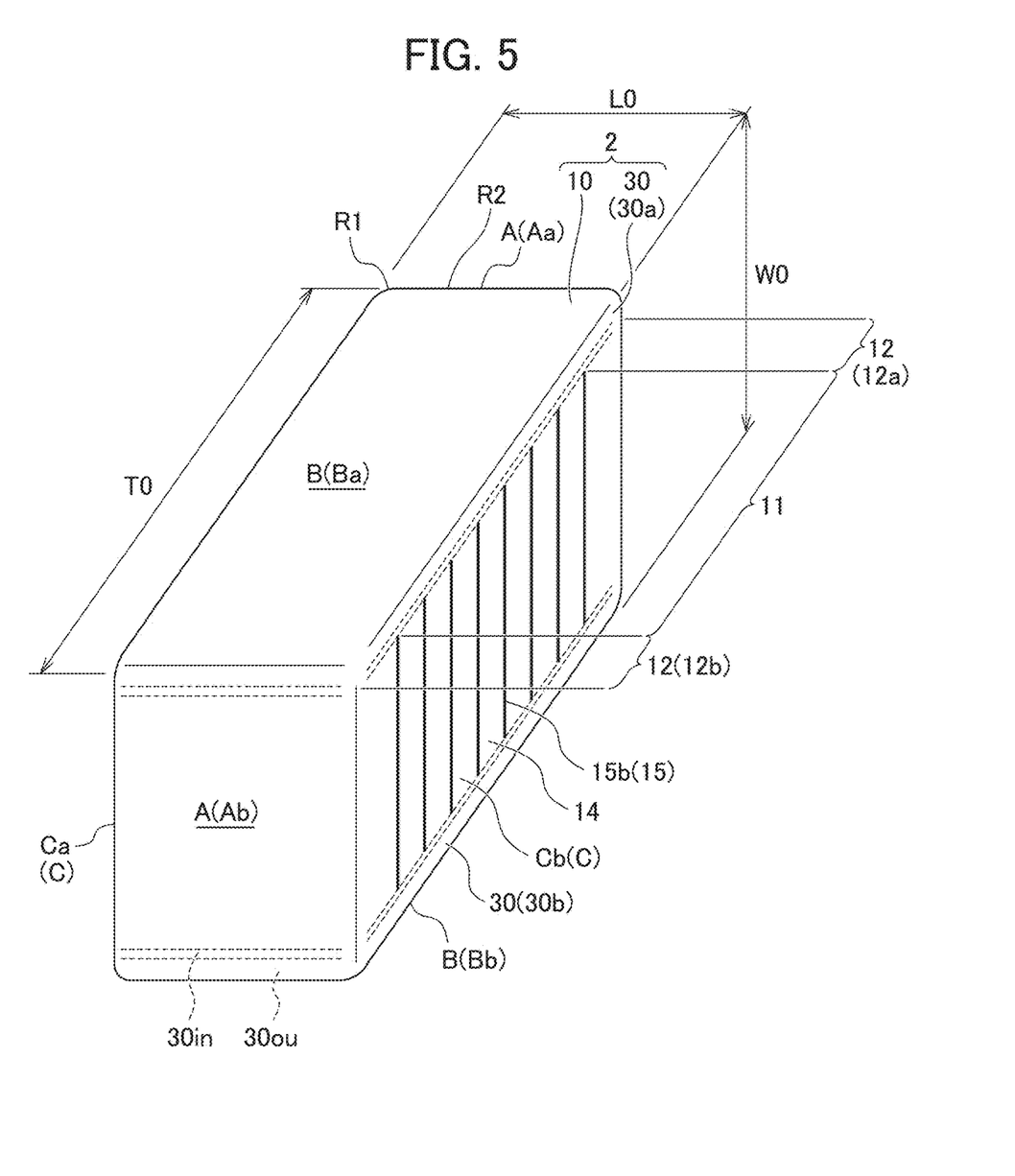
FIG. 5 is a perspective view of a multilayer body.
Figure 6:
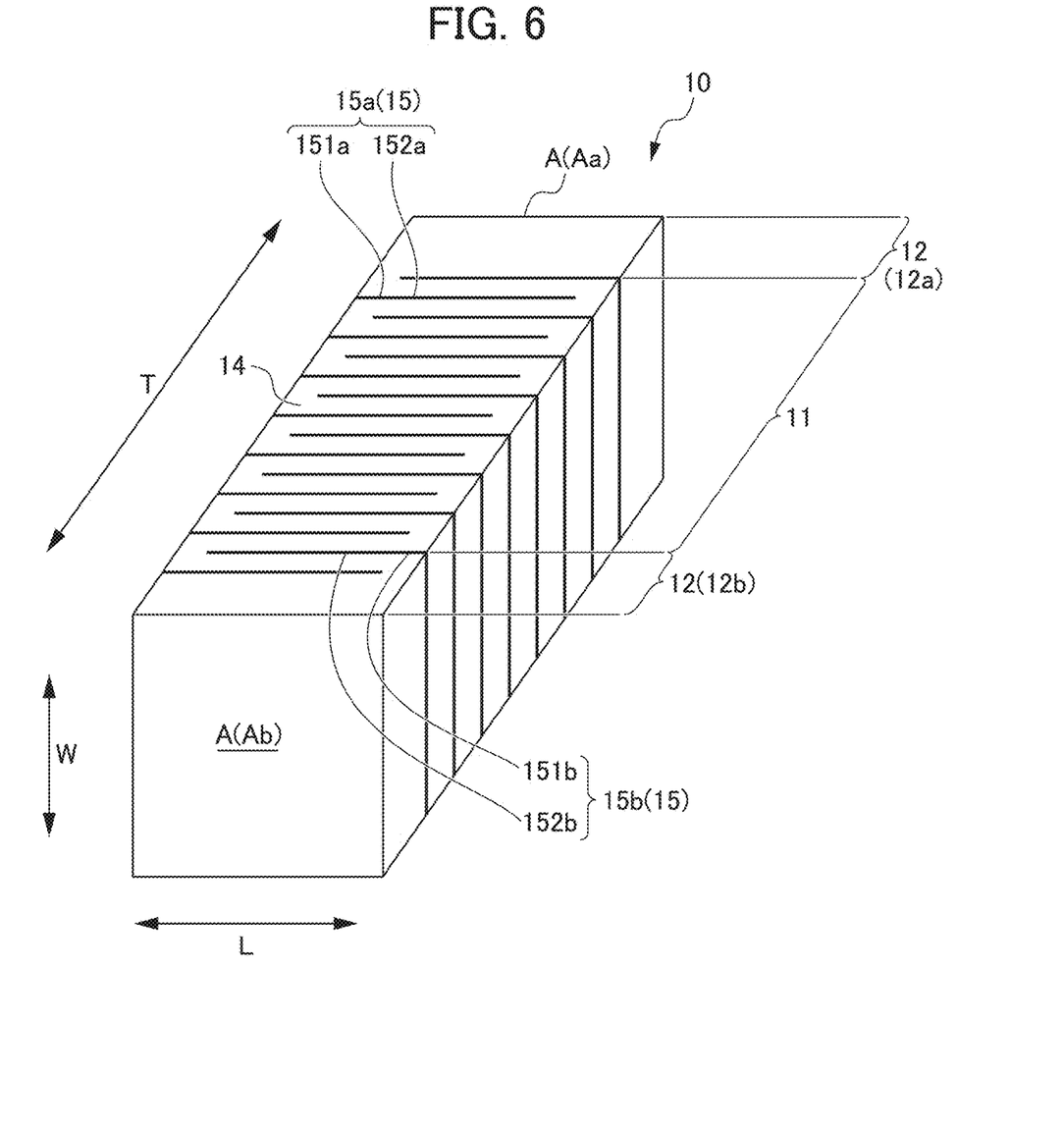
FIG. 6 is a perspective view of a multilayer main body before side gap portions are formed.

FIG. 5 is a perspective view of the multilayer body 2. The multilayer body 2 includes the multilayer main body 10 and side gap portions 30. FIG. 6 is a perspective view of the multilayer main body 10 before the side gap portions 30 are provided.

In the following description, among the six outer surfaces of the multilayer body 2 shown in FIG. 5, a pair of outer surfaces opposed in the lamination direction T is defined as a first main surface Aa and a second main surface Ab, a pair of outer surfaces opposed in the width direction W is defined as a first side surface Ba and a second side surface Bb, and a pair of outer surfaces opposed in the length direction L is defined as a first end surface Ca and a second end surface Cb. When it is not necessary to particularly distinguish the first main surface Aa and the second main surface Ab from each other, they are collectively described as the main surface A; when it is not necessary to particularly distinguish the first side surface Ba and the second side surface Bb from each other, they are collectively described as the side surface B; and when it is not necessary to particularly distinguish the first end surface Ca and the second end surface Cb from each other, they are collectively described as the end surface C.

Multilayer Body 2

The multilayer body 2 includes a rounded corner portion R1 and a rounded ridge portion R2. The corner portion R1 is a portion where the main surface A, the side surface B, and the end surface C intersect. The ridge portion R2 is a portion where two surfaces of the multilayer body 2, i.e., the main surface A and the side surface B, the main surface A and the end surface C, or the side surface B and the end surface C, intersect. In addition, surface irregularities and the like may be provided on a portion or all of the main surface A, the side surface B, and the end surface C of the multilayer body 2.

In the present preferred embodiment, as shown in FIG. 5, in the multilayer body 2, when the dimension in the length direction is defined as L0, the dimension in the width direction W is defined as W0, and the dimension in the lamination direction T is defined as T0, a relationship of L0<W0<T0 is satisfied. Each dimension is not particularly limited. However, in the present preferred embodiment, for example, the dimension L0 in the length direction is about 0.2 mm to about 1.2 mm, and preferably about 0.3 mm to about 1.1 mm; the dimension W0 in the width direction is about 0.4 mm to about 1.5 mm, and preferably about 0.5 mm to about 1.3 mm; and the dimension T0 in the lamination direction is about 0.45 mm to about 2.0 mm, and preferably about 0.6 mm to about 1.5 mm. All dimensions shall include tolerances of about ±10%.

Multilayer Main Body 10

The multilayer main body 10 includes the inner layer portion 11, an upper outer layer portion 12a provided close to the first main surface Aa of the inner layer portion 11, and a lower outer layer portion 12b provided close to the second main surface Ab of the inner layer portion 11. When it is not necessary to particularly distinguish between the upper outer layer portion 12a and the lower outer layer portion 12b, they are collectively described as the outer layer portion 12.

Inner Layer Portion 11

The inner layer portion 11 includes a plurality of sets of the dielectric layers 14 and the internal electrode layers 15 laminated alternately along the lamination direction T.

Dielectric Layer 14

The dielectric layer 14 includes at least one of Ca (calcium), Zr (zirconium), and Ti (titanium). As an example, the dielectric layer 14 includes a perovskite compound optionally including Ca, Zr, Sr, or Ti, and examples of the perovskite compound include $CaZrO_3$ (calcium zirconate), CaTiO (calcium titanate), $SrTiO_3$ (strontium titanate), $BaZrO_3$ (proton-conductive metallic oxide), and titanium oxide ($TiO_2$). Normally, in the multilayer ceramic capacitor 1, oxygen vacancies are generated by firing in a reducing atmosphere. However, particularly in $CaZrO_3$, the generation of oxygen vacancies is able to be reduced or prevented because the band gap is large. As a result, high reliability is able to be provided. In addition, for example, Mn compounds, Fe compounds, Cr compounds, Co compounds, Ni compounds, and the like may be further added using these as main raw materials.

Since a material including at least one of Ca (calcium), Zr (zirconium), and Ti (titanium) is used for the dielectric layer 14 of the present preferred embodiment, the relative dielectric constant is about 20 to about 300, and the capacitance is smaller compared to an electronic component having a high dielectric constant. Furthermore, the dielectric layer 14 of the present preferred embodiment has a characteristic in that the relative dielectric constant varies substantially linearly with respect to temperature, and therefore, it is excellent in heat resistance and high-frequency characteristics. Furthermore, in the dielectric layer 14 of the present preferred embodiment, the change over time of the capacitance value is negligibly small, the loss of the capacitor is small, and it is excellent in stability even at high temperature, high power, and high frequency. In addition, in the dielectric layer 14, there is little change over time of the dielectric constant or due to voltage application.

The thickness tu of the dielectric layer 14 is preferably about $0.8 \, \mu m \leq tu \leq$ about $30.0 \, \mu m$ (about $0.40 \, \mu m$ or more and about $0.50 \, \mu m$ or less), for example. It is more preferably about $2.5 \, \mu m \leq tu \leq$ about $4.0 \, \mu m$, for example. The number of dielectric layers 14 included in the multilayer main body 10 including the upper outer layer portion 12a and the lower outer layer portion 12b is preferably fifteen sheets or more and 700 sheets or less, for example.

Internal Electrode Layer 15

The internal electrode layers 15 include a plurality of first internal electrode layers 15a, and a plurality of second internal electrode layers 15b. The first internal electrode layers 15a and the second internal electrode layers 15b are provided alternately one by one. However, the preferred embodiments of the present invention are not limited to one first internal electrode layer 15a and one second internal electrode layer 15b being provided alternately, and may include two first internal electrode layers 15a and two second internal electrode layers 15b that are provided alternately, or may include two or more first internal electrode layers 15a and two or more second internal electrode layers 15b that are provided alternately. Furthermore, preferred embodiments of the present invention may include different numbers of layers between the first internal electrode layers 15a and the second internal electrode layers 15b that are provided alternately. In the following, when it is not necessary to distinguish the first internal electrode layer 15a from the second internal electrode layer 15b, they are collectively described as the internal electrode layer 15.

The internal electrode layer 15 mainly includes Cu. Since Cu is used for the internal electrode layer 15 in this way, for example, the resistance is small as compared with a case in which Ni is used.

As shown in FIG. 4, in the internal electrode layer 15, when the length in the length direction L is defined as L1, and the width in the width direction W is defined as W1, a relationship of L1<W1 is satisfied.

The thickness tn of the internal electrode layer 15 (the length in the lamination direction T) is preferably about 0.8 µm≤tn≤ about 2.0 µm (about 0.25 µm or more and about 0.33 µm or less), for example.

The number of the internal electrode layers 15 is preferably fifteen sheets or more and 700 sheets or less in total of the first internal electrode layers 15a and the second internal electrode layers 15b, for example.

As shown in FIGS. 2 and 6, the first internal electrode layer 15a includes a first opposing portion 152a provided opposite to the second internal electrode layer 15b, and a first lead-out portion 151a drawn from the first opposing portion 152a to the side of the first end surface Ca. An end of the first lead-out portion 151a is exposed at the first end surface Ca, and is electrically connected to a first external electrode layer 3a described later. The second internal nickel electrode layer 15b includes a second opposing portion 152b provided opposite to the first internal electrode layer 15a, and a second lead-out portion 151b drawn from the second opposing portion 152b to the second end surface Cb. An end of the second lead-out portion 151b is electrically connected to a second external electrode layer 3b described later. Charge is accumulated in the first opposing portion 152a of the first internal electrode layer 15a and the second opposing portion 152b of the second internal electrode layer 15b, and thus the characteristics of the capacitor are developed.

As shown in FIG. 3B, the deviation amount d in the width direction W between the positions of the ends of the first internal electrode layer 15a and the second internal electrode layer 15b vertically adjacent to each other in the lamination direction T is about 0.5 µm or less, for example. That is, the ends in the width direction W of the first internal electrode layer 15a and the second internal electrode layer 15b vertically adjacent to each other in the lamination direction T is substantially at the same position in the width direction W, and the positions of the ends are substantially aligned in the lamination direction T.

Outer Layer Portion 12

The outer layer portion 12 includes a ceramic material including at least one of Ca, Zr, and Ti, and is the same or substantially the same material as the dielectric layer 14 of the inner layer portion 11.

The outer layer portion 12 includes the upper outer layer portion 12a provided on the upper side in the lamination direction T of the inner layer portion 11, and the lower outer layer portion 12b provided on the lower side in the lamination direction T of the inner layer portion 11. In the present preferred embodiment, the upper outer layer portion 12a has the same or substantially the same length (thickness tg1) as the lower outer layer portion 12b in the lamination direction T, and it is preferable for about 10 µm≤tg1≤ about 20 µm (about 10 µm or more and about 20 µm or less), for example.

However, preferred embodiments of the present invention are not limited thereto, and the lower outer layer portion 12b, which is located on the side on which the substrate 100 is mounted, may have a thickness which is thicker than a thickness of the upper outer layer portion 12a in the lamination direction T. In other words, the inner layer portion 11 including the internal electrode layers 15 may be biased toward the first main surface Aa in the lamination direction T. In the multilayer ceramic capacitor 1, electric power is supplied to the internal electrode layer 15, and an electric field is applied to the dielectric layer 14, a result of which there is a possibility that stress and mechanical strain are generated in the dielectric layer 14, which cause vibration. However, when the lower outer layer portion 12b is thicker than the upper outer layer portion 12a in the lamination direction T, the vibration is hardly transmitted to the substrate 100 on which the multilayer ceramic capacitor 1 is mounted, and thus, the occurrence of "acoustic noise" is reduced or prevented.

Side Gap Portion 30

The side gap portions 30 cover the ends in the width direction W of the internal electrode layers 15 exposed on both side surfaces of the multilayer main body 10 along the ends thereof. The side gap portions 30 include a first side gap portion 30a provided on the first side surface Ba of the multilayer main body 10, and a second side gap portion 30b provided on the second side surface Bb of the multilayer main body 10. When it is not necessary to particularly distinguish the first side gap portion 30a and the second side gap portion 30b from each other, they are collectively described as the side gap portion 30.

Thickness of the Side Gap Portion 30

The thickness ts of the side gap portion 30 is preferably about 5 µm≤ts≤ about 12 µm (about 5 µm or more and about 12 µm or less), for example. The thickness depends on the size of the multilayer body. However, it may be about 250 µm at the maximum, for example.

The side gap portions 30 each include a ceramic material including at least one of Ca, Zr, and Ti, and is the same or substantially the same material as the dielectric layer 14 of the inner layer portion 11, and the outer layer portion 12.

The side gap portions 30 each include a plurality of layers. When the inner layer thereof is defined as an inner layer 30in and the outer layer thereof is defined as the outer layer 30ou, the thickness is expressed as the inner layer 30in< the outer layer 30ou. However, preferred embodiments of the present invention are not limited thereto, and the side gap portion 30 may include a single layer. With a two-layer structure, since an interface is provided between the outer layer 30ou and the inner layer 30in, it is possible to alleviate the stress acting on the multilayer ceramic capacitor 1 by this interface.

External Electrode Layer 3

The external electrode layer 3 includes a first external electrode layer 3a provided on a first end surface Ca of the multilayer body 2, and a second external electrode layer 3b provided on a second end surface Cb of the multilayer body 2.

The first external electrode layer 3a includes a first sintered electrode layer 31a, a first Cu-plated layer 32a provided on an outer side of the first sintered electrode layer 31a, a first Ni-plated layer 33a provided on an outer side of the first Cu-plated layer 32a, and a first Sn-plated layer 34a provided on an outer side of the first Ni-plated layer 33a. The first sintered electrode layer 31a includes a metal including Ni, and dielectric particles 311 including at least one of Ca, Zr, and Ti, which are the same or substantially the same material as the dielectric layer 14 of the inner layer portion 11 and the outer layer portions 12.

The second external electrode layer 3b includes a second sintered electrode layer 31b, a second Cu-plated layer 32b provided on an outer side of the second sintered electrode layer 31b, a second Ni-plated layer 33b provided on an outer side of the second Cu-plated layer 32b, and a second Sn-plated layer 34b provided on an outer side of the second Ni-plated layer 33b. The second sintered electrode layer 31b includes a metal including Ni, and the dielectric particles 311 including at least one of Cb, Zr, and Ti, which are the same or substantially the same material as the dielectric layer 14 of the inner layer portion 11 and the outer layer portions 12.

However, the first sintered electrode layer 31a and the second sintered electrode layer 31b may include a metal including Cu, and the dielectric particles 311 including at least one of Ca, Zr, and Ti, which are the same or substantially the same material as the dielectric layer 14 of the inner layer portion 11 and the outer layer portions 12.

When it is not necessary to distinguish the first external electrode layer 3a and the second external electrode layer 3b from each other, they are collectively described as the external electrode layer 3. The external electrode layer 3 covers not only the end surface C but also portions close to the end surface C of the main surface A and the side surface B. When it is not necessary to particularly distinguish between the first sintered electrode layer 31a and the second sintered electrode layer 31b, they are collectively described as the sintered electrode layer 31. When it is not necessary to particularly distinguish between the first Cu-plated layer 32a and the second Cu-plated layer 32b, they are collectively described as the Cu-plated layer 32. When it is not necessary to particularly distinguish between the first Ni-plated layer 33a and the second Ni-plated layer 33b, they are collectively described as the Ni-plated layer 33. When it is not necessary to particularly distinguish between the first Sn-plated layer 34a and the second Sn-plated layer 34b, they are collectively described as the Sn-plated layer 34. Although an exemplary preferred embodiment describes an implementation including three layers of the Cu-plated layer 32, the Ni-plated layer 33, and the Sn-plated layer 34, preferred embodiments of the present invention are not limited to thereto. Preferred embodiments of the present invention may include any one, two, or four or more layers among the Cu-plated layer 32, the Ni-plated layer 33, and the Sn-plated layer 34, or may not include any plated layer.

The end of the first lead-out portion 151a of the first internal electrode layer 15a is exposed at the first end surface Ca, is electrically connected to a sintered electrode layer 31 of the first external electrode layer 3a. The end of the second lead-out portion 151b of the second internal electrode layer 15b is exposed at the second end surface Cb, is electrically connected to the sintered electrode layer 31 of the second external electrode layer 3b. Thus, a structure in which a plurality of capacitor elements is electrically connected in parallel is established between the first external electrode layer 3a and the second external electrode layer 3b.

In the cross section LT extending in the lamination direction T and the length direction L, as shown in FIG. 2B, for example, the dielectric particles 311 in the sintered electrode layer 31 have the area ratio M of about 35%≤M≤ about 42%.

The cross section is not limited to the cross section LT shown in FIGS. 2A and 2B, and may be a cross section in any direction.

The dielectric particles 311 are uniformly or substantially uniformly dispersed within the sintered electrode layer 31. In other words, the entire or substantially the entire boundary portion between the internal electrode layer and the sintered electrode layer 31 is not covered by the dielectric particles 311. Therefore, at least partial contact between the internal electrode layer 15 and the metal including Ni in the sintered electrode layer 31 is ensured. Therefore, the inner electrode layer, the sintered electrode layer 31, the Cu-plated layer 32, the Ni-plated layer 33, and the Sn-plated layer 34 are in conduction with each other.

Furthermore, as described later, the sintered electrode layer 31 and the internal electrode layer 15 are simultaneously sintered (cofired), and a Cu and Ni interdiffusion region of different metals is formed at the boundary portion between the sintered electrode layer 31 and the internal electrode layer 15 by the sintering (cofiring). This interdiffusion region firmly bonds the sintered electrode layer 31 and the internal electrode layer 15.

Furthermore, as shown in FIG. 1, the multilayer ceramic capacitor 1 of the present preferred embodiment described above is mounted such that the surface TL extending in the lamination direction T and the length direction L faces the substrate 100.

Method of Manufacturing a Multilayer Ceramic Capacitor 1

Figure 7:
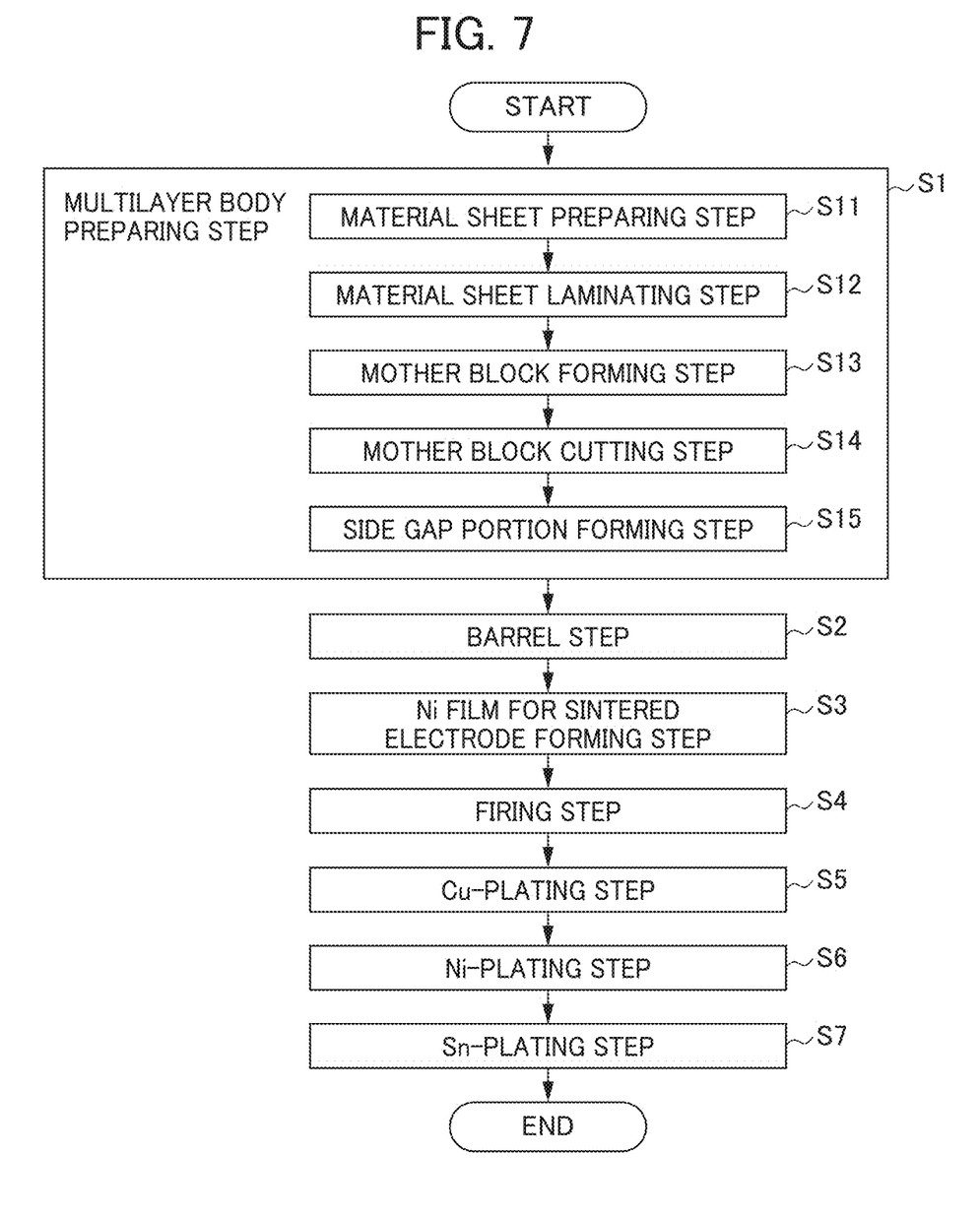
FIG. 7 is a flowchart showing a method of manufacturing a multilayer ceramic capacitor.
Figure 8:
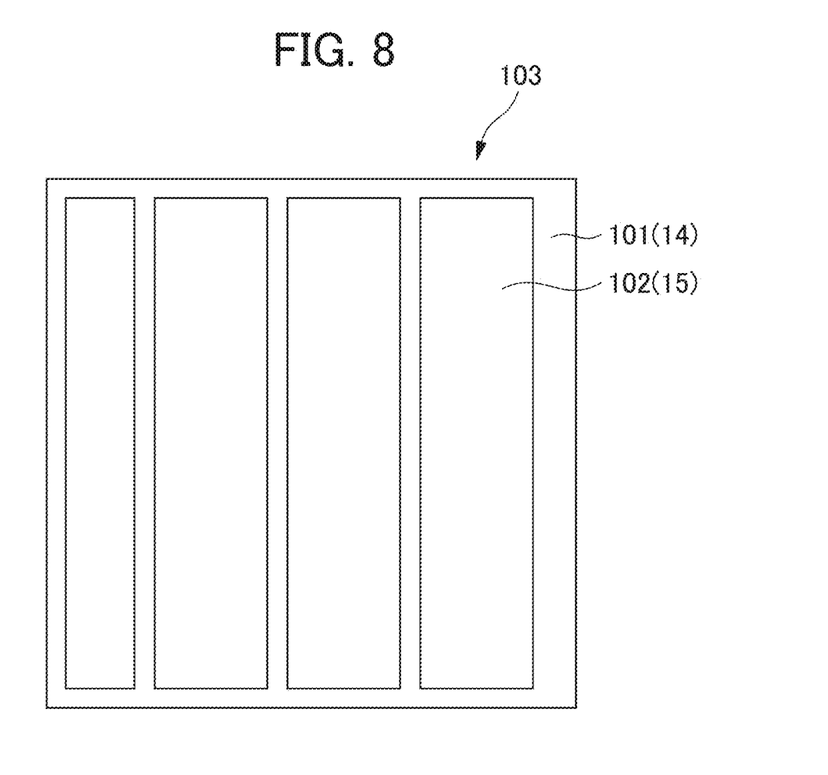
FIG. 8 is a diagram showing a multilayer body preparing step.

FIG. 7 is a flowchart showing a non-limiting example of a method of manufacturing the multilayer ceramic capacitor 1. The method of manufacturing the multilayer ceramic capacitor 1 includes a multilayer body preparing step S1 of preparing the multilayer body 2. The multilayer body preparing step S1 further includes a material sheet preparing step S11, a material sheet laminating step S12, a mother block forming step S13, a mother block cutting step S14, and a side gap portion forming step S15. FIG. 8 is a diagram showing the multilayer body preparing step S1.

Material Sheet Preparing Step S11

In the material sheet preparing step S11, first, a powder including at least one of Ca, Zr, and Ti is prepared. Examples of such a powder include a perovskite compound optionally including Ca, Zr, Sr, or Ti, and examples of the perovskite compound include $CaZrO_3$ (calcium zirconate), $CaTiO$ (calcium titanate), $SrTiO_3$ (strontium titanate), $BaZrO_3$ (proton-conductive metallic oxide), and titanium oxide ($TiO_2$).

The powder is weighed to provide a predetermined composition, and then wet-mixed using a ball mill or the like. The resulting mixture is dried and crushed. The powder obtained by crushing is calcined in the atmosphere, for example at a temperature of about 900° C. or higher and about 1400° C. or less for about 2 hours. The calcined powder is crushed again, and a raw material powder of the main component is obtained.

Subsequently, as a raw material including sub components, for example, the respective powders of $SiO_2$ (silicone diode), $MnCO_3$ (manganese carbonate), and $Al_2O_3$ (aluminum oxide) are prepared. The raw material powder of the main component and the raw material powder of the sub component are weighed so that the raw material powder of the sub component has a predetermined blending ratio to the above raw material powder of the main component, following which wet mixing using a ball mill or the like is performed. Thereafter, the obtained mixture is dried and crushed to obtain a raw material powder.

Next, by adding, for example, polyvinyl butyral-based binder and an organic solvent such as ethanol or toluene to 100 parts by weight of the obtained raw material powder and wet mixing by a ball mill, a ceramic slurry is prepared. The ceramic slurry is molded using a die coater, gravure coater, a microgravure coater, or the like on a carrier film, and thus a multilayer ceramic green sheet 101 having a predetermined thickness (about 5 µm to about 50 µm) is produced. Furthermore, an outer layer portion ceramic green sheet 112 defining and functioning as the outer layer portion 12 is also similarly manufactured.

Subsequently, the conductive paste 102 defining and functioning as the internal electrode layer 15 and including Cu as a main component is printed to form a strip-shaped pattern by screen printing, ink jet printing, gravure printing, or the like on the multilayer ceramic green sheet 101.

Thus, as shown in FIG. 8, a material sheet 103 is prepared in which the conductive paste 102 defining and functioning as the internal electrode layer 15 is printed on the surface of the multilayer ceramic green sheet 101 defining and functioning as the dielectric layer 14.

Material Sheet Laminating Step S12

Figure 9:
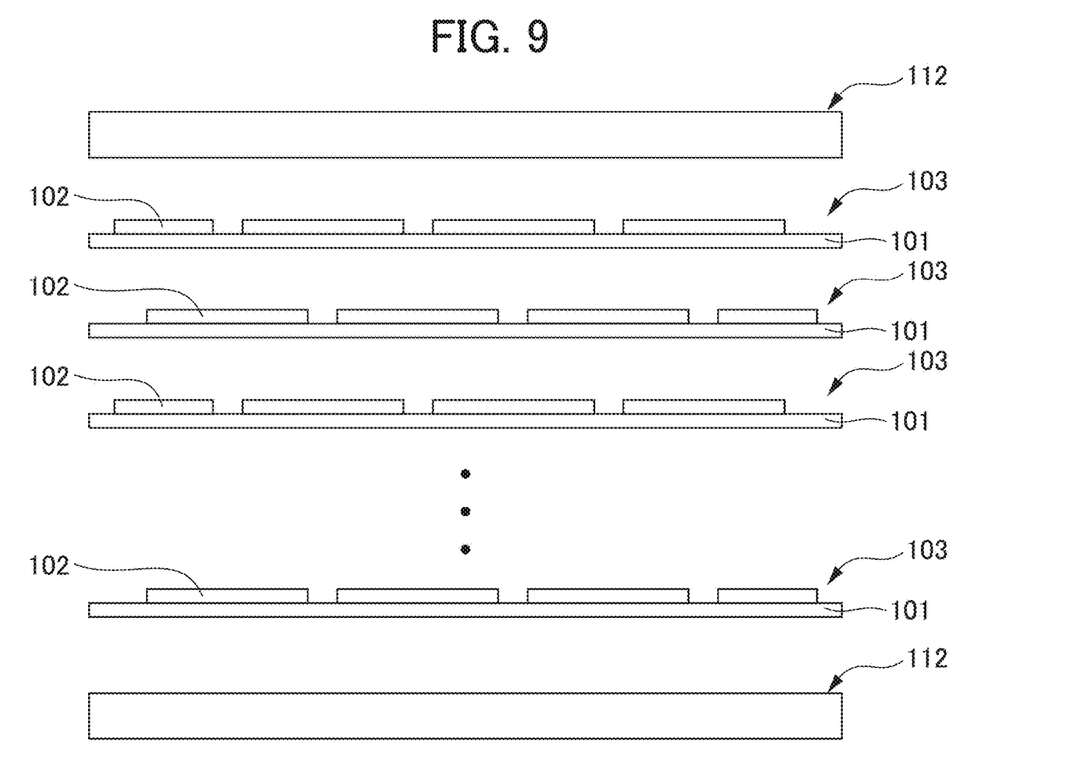
FIG. 9 shows a plurality of material sheets being laminated in a material sheet laminating step.

Next, as shown in FIG. 9, a plurality of material sheets 103 is laminated in a material sheet laminating step S12. More specifically, the plurality of material sheets 103 is laminated such that strip-shaped conductive pastes 102 are directed in the same or substantially the same direction and are shifted by half pitch in the width direction between the adjacent material sheets 103. Furthermore, the outer layer portion ceramic green sheet 112 defining and functioning as the outer layer portion 12 is laminated on both sides of the plurality of laminated material sheets 103.

Mother Block Forming Step S13

Subsequently, in a mother block forming step S13, the upper outer layer portion ceramic green sheet 112, the plurality of laminated material sheets 103, and the lower outer layer portion ceramic green sheet 113 are subjected to thermocompression bonding. As a result, the mother block 110 shown in FIG. 10 is formed.

Mother Block Cutting Step S14

Figure 10:
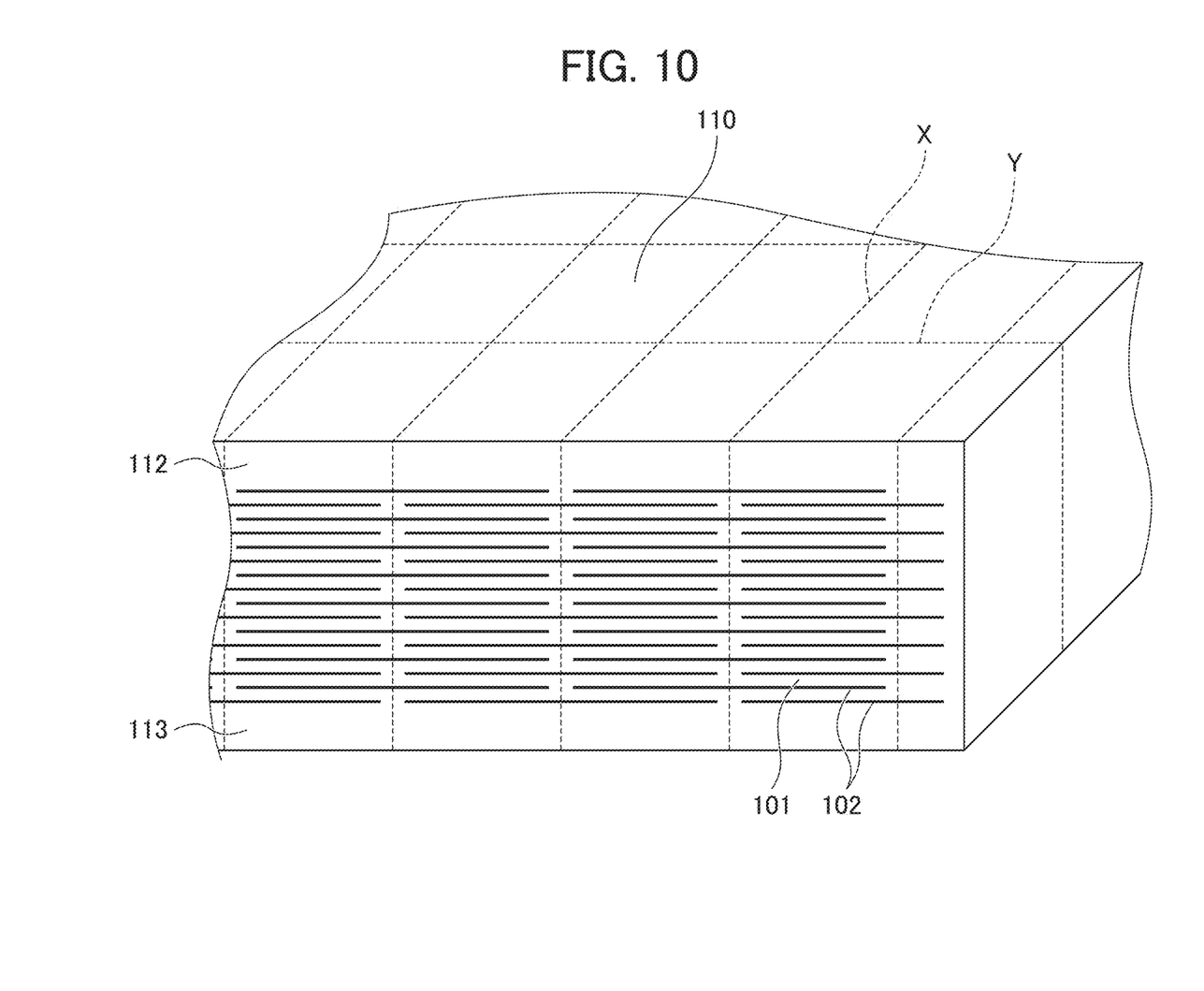
FIG. 10 shows a mother block.

Then, in a mother block cutting step S14, the mother block 110 is cut along a cutting line X and a cutting line Y intersecting the cutting line X corresponding to the dimension of the multilayer main body 10 as shown in FIG. 10. As a result, the multilayer main body 10 shown in FIG. 6 is manufactured. The cutting line Y is orthogonal or substantially orthogonal to the cutting line X in the preferred embodiment. At this time, the internal electrode layer 15 is exposed at the side portion of the multilayer main body 10.

Side Gap Portion Forming Step S15

Next, in a side gap portion forming step S15, a ceramic slurry is produced which includes at least one of Ca, Zr, and Ti which is similar to that of the multilayer ceramic green sheet 101. Then, the ceramic slurry is coated on a resin film, and dried to produce a side gap portion ceramic green sheet 114. The side gap portion ceramic green sheet 114 is manufactured for an inner layer 30in and for an outer layer 30ou.

The side surface LT where the internal electrode layer 15 of the multilayer main body 10 is exposed is first pressed against the side gap portion ceramic green sheet 114 for the inner layer 30in. Thus, the side gap portion ceramic green sheet 114 is crimped against the side surface LT of the multilayer main body 10, and the shearing force acts on the end of the side surface LT of the multilayer main body 10, to punch the side gap portion ceramic green sheet 114. Accordingly, one surface of the side surface LT of the multilayer main body 10 is covered with the side gap portion ceramic green sheet 114. Next, the other surface of the side surface LT of the multilayer main body 10 is also covered with the side gap portion ceramic green sheet 114 for the inner layer 30in in a similar process.

Furthermore, the side gap portion ceramic green sheet 114 for the outer layer 30ou also covers both outer surfaces of the side gap portion ceramic green sheet 114 for the inner layer 30in on the side surface LT of the multilayer main body 10. Thus, the multilayer body 2 before sintering is formed in which the side gap portion 30 of the two layers of the inner layer 30in and the outer layer 30ou is adhered to the side surface LT of the multilayer main body 10.

Barrel Step S2

Next, in a barrel step S2, the multilayer body 2 is subjected to barrel polishing. As a result, as shown in FIG. 5, the corner portion R1 and the ridge portion R2 of the multilayer body 2 are rounded.

Ni film for the Sintered Electrode Forming Step S3

In the Ni film for the sintered electrode forming step S3, the end surface C is immersed in the conductive paste including a metal including Ni and dielectric particles 311 including at least one of Ca, Zr and Ti. The amount of dielectric particles 311 included in the conductive paste is indicative of the amount of the dielectric particles 311 after sintering, which is the next step, having the area ratio of about 35%≤M≤ about 42%, for example. With this ratio, the shrinkage amount of the multilayer body 2 during sintering and the amount of shrinkage of the sintered electrode layer 31 are equal or substantially equal, or the difference between the shrinkage amount of the multilayer body 2 and the amount of shrinkage of the sintered electrode layer 31 is small. In other words, this ratio is adjusted to not cause cracks or gaps between the sintered electrode layer 31 and the multilayer body 2 due to the shrinkage difference at the time of sintering.

Firing Step S4

In the firing step S4, firing is performed for a predetermined time under a predetermined condition after the conductive paste including a metal including Ni and the dielectric particles 311 including at least one of Ca, Zr, and Ti is dried. That is, the sintered electrode layer 31 is sintered simultaneously (cofired) with the sintering of the multilayer body 2. A Cu and Ni interdiffusion region of different metals is formed at the boundary portion between the sintered electrode layer 31 and the internal electrode layer 15 by the sintering (cofiring). As shown in FIG. 2B, an alloy layer 312 of Cu and Ni is formed in the interdiffusion region. The alloy layer 312 firmly bonds the sintered electrode layer 31 and the internal electrode layer 15.

At this time, the conductive paste forming the sintered electrode layer 31 includes the dielectric particles 311 having, for example, an amount of about 35%≤M≤ about 42% after the sintering. With this ratio, the shrinkage amount of the multilayer body 2 during sintering and the amount of shrinkage of the sintered electrode layer 31 are substantially equal, or the difference therebetween is slight. Therefore, cracks or gaps do not occur between the sintered electrode layer 31 and the multilayer body 2 due to the shrinkage difference at the time of sintering.

At this time, since the conductive paste forming the sintered electrode layer 31 includes the dielectric particles 311 having an amount of about 35%≤M≤42% after the sintering, cracks or gaps do not occur between the sintered electrode layer 31 and the multilayer body 2 due to the shrinkage difference at the time of sintering.

Cu-Plating Step S5

Then, the Cu-plated layer 32 is formed on the outer periphery of the external electrode layer 3.

Ni-Plating Step S6

Then, the Ni-plated layer 33 is formed on the outer periphery of the Cu-plated layer 32.

Sn-plating Step S7

Furthermore, the Sn-plated layer 34 is formed on the outer periphery of the Ni-plated layer 33.

As shown in FIG. 1, the multilayer ceramic capacitor 1 of the present preferred embodiment manufactured by the above steps is mounted such that the surface TL extending in the lamination direction T and the length direction L faces the substrate 100. Although the present preferred embodiment of the present invention has been described above, the present invention is not limited to this preferred embodiment, and various modifications may be implemented within the scope and the gist thereof.

As described above, the multilayer ceramic capacitor 1 according the present preferred embodiment includes a multilayer body 2 including dielectric layers 14 and internal electrode layers laminated alternately on each other, and external electrode layers 3 provided on both end surfaces of the multilayer body 2 in a length direction L orthogonal or substantially orthogonal to a lamination direction T, and each connected with the internal electrode layers 15, where the dielectric layers 14 each include at least one of Ca, Zr, or Ti, the internal electrode layers 15 each include Cu, and when a dimension in the lamination direction T of the multilayer body 2 is defined as T0, a dimension in the length direction L of the multilayer body 2 is defined as L0, and a dimension in a width direction orthogonal or substantially orthogonal to the lamination direction T and the length direction L is defined as W0, a relationship of L0<W0<T0 is satisfied.

That is, the number of laminated sheets is able to be increased because the dimension T0 in the lamination direction T is larger, and thus the capacitance is able to be increased. Furthermore, since L0 is smaller, the interval of the external electrode layers 3 of the multilayer ceramic capacitor 1 is able to be reduced. Therefore, the size of the multilayer ceramic capacitor 1 is able to be reduced in the dimension in the length direction L.

Furthermore, when a dimension in the width direction of the internal electrode layers 15 is defined as W1, and a dimension in the length direction of the internal electrode layers is defined as L1, a relationship of L1<W1 may be satisfied. When AC current flows through the multilayer ceramic capacitor 1, the AC current flows in the length direction L. Since L1 is shorter, the ESL (equivalent series inductance) is able to be reduced. Since W1 is larger, and thus it is possible to flow a large amount of AC current, the ESR (equivalent series resistance) is able to be reduced. When ESR and ESL are small, it is possible to obtain good responsiveness of the multilayer ceramic capacitor 1, and thus good high-frequency characteristics are able to be provided. Furthermore, the power consumption of the multilayer ceramic capacitor 1 is able to be reduced because ESR is small, and thus the temperature rise is able to be lowered. Since the dimension of the multilayer body 2 is set to satisfy L0<W0, it is possible to readily satisfy the dimension of the internal electrode layer 15 to L1<W1.

The external electrode layers 3 each may include a sintered electrode layer 31 in which dielectric particles 311 including at least one of Ca, Zr, or Ti are included in a metal including Ni, for example.

The sintered electrode layer 31 and the internal electrode layer 15 are simultaneously sintered (cofired), and a Cu and Ni interdiffusion region of different metals is provided at the boundary portion between the sintered electrode layer 31 and the internal electrode layer 15 by the sintering (cofiring). The alloy layer 312 of Cu and Ni is provided in the interdiffusion region. The alloy layer 312 firmly bonds the sintered electrode layer 31 and the internal electrode layer 15.

Further, since the sintered electrode layer 31 includes the dielectric particles 311, no cracks or gaps occur between the sintered electrode layer 31 and the multilayer body 2 due to the shrinkage difference during sintering.

In the multilayer ceramic capacitor 1 of the present preferred embodiment, a relationship of L0<W0<T0 is satisfied, and as shown in FIG. 1, the multilayer ceramic capacitor 1 is mounted such that the surface TL extending in the lamination direction T and the length direction L faces the substrate 100. When the multilayer ceramic capacitor 1 is sintered, there is a possibility that warpage occurs in the dielectric layer 14 or the internal electrode layer 15. That is, there is a possibility that warpage occurs at the surface LW. In such a case, there is a possibility that cracks occur along the surface LW in the middle of the lamination direction T, and thus the external electrode layer 3 is divided. In this case, for example, when the surface LW of the multilayer ceramic capacitor 1 is bonded to the substrate, the upper portion in the lamination direction T than the portion where cracks occur in the external electrode layer 3 occurs comes to be electrically disconnected from the substrate 100. However, in the present preferred embodiment, since the surface TL of the multilayer ceramic capacitor 1 is bonded to the substrate 100, the external electrode layer 3 is connected to the substrate 100 over the entire length of the lamination direction L. Therefore, even if cracks occur entirely in the external electrode layer 3 in the middle of the lamination direction T, since the entire external electrode layer 3 is electrically connected to the substrate 100, the connection failure is less likely to occur.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
a multilayer body including dielectric layers and internal electrode layers laminated alternately on each other; and
external electrode layers on opposing end surfaces of the multilayer body in a length direction orthogonal or substantially orthogonal to a lamination direction; wherein
each of the external electrode layers is connected with the internal electrode layers;
the dielectric layers each include at least one of Ca, Zr, and Ti;
the internal electrode layers each include Cu; and
when a dimension in the lamination direction of the multilayer body is defined as T0, a dimension in the length direction of the multilayer body is defined as L0, and a dimension in a width direction orthogonal or substantially orthogonal to the lamination direction and the length direction is defined as W0, a relationship of L0<W0<T0 is satisfied.

2. The electronic component according to claim 1, wherein, when a dimension in the width direction of the internal electrode layers is defined as W1, and a dimension in the length direction of the internal electrode layers is defined as L1, a relationship of L1<W1 is satisfied.

3. The electronic component according to claim 1, wherein the external electrode layers each include a sintered electrode layer in which dielectric particles including at least one of Ca, Zr, and Ti are included in a metal including Ni.

4. The electronic component according to claim 1, wherein the external electrode layers each include a sintered electrode layer in which dielectric particles including at least one of Ca, Zr, and Ti are included in a metal including Cu.

5. The electronic component according to claim 1, wherein:
the external electrode layers each include:
a first external electrode layer on a first end surface of the opposing end surfaces in the length direction; and
a second external electrode layer provided on a second end surface of the opposing end surfaces in the length direction; and
the internal electrode layers each include:
at least one first internal electrode connected to the first external electrode layer; and at least one second internal electrode connected to the second external electrode layer; and a plurality of the first internal electrodes and a plurality of the second internal electrodes are provided alternately in the lamination direction.

6. The electronic component according to claim 1, wherein, in the multilayer body,
a dimension in the length direction is about 0.2 mm to about 1.2 mm;
a dimension in the width direction orthogonal or substantially orthogonal to the lamination direction and the length direction is about 0.4 mm to about 1.5 mm; and
a dimension in the lamination direction is about 0.45 mm to about 2.0 mm.

7. The electronic component according to claim 1, wherein a laminated number of the internal electrode layers is fifteen or more and 700 or less.

8. The electronic component according to claim 1, wherein the electronic component defines a multilayer ceramic capacitor.

9. The electronic component according to claim 1, wherein the dielectric layers include a perovskite compound.

10. The electronic component according to claim 1, wherein a thickness of each of the dielectric layers is about 0.40 μm or more and about 0.50 μm or less.

11. The electronic component according to claim 1, wherein a thickness of each of the internal electrode layers is about 0.25 μm or more and about 0.33 μm or less.

12. The electronic component according to claim 3, wherein, in a cross section extending in the lamination direction and the length direction, the dielectric particles of the sintered electrode layer have an area ratio of about 35% or more and about 42% or less.

13. The electronic component according to claim 4, wherein, in a cross section extending in the lamination direction and the length direction, the dielectric particles of the sintered electrode layer have an area ratio of about 35% or more and about 42% or less.

14. The electronic component according to claim 1, wherein side gap portions are provided on opposing surfaces of the multilayer body in the width direction orthogonal or substantially orthogonal to the lamination direction.

15. The electronic component according to claim 14, wherein each of the side gap portions includes a ceramic material including at least one of Ca, Zr, and Ti.

16. The electronic component according to claim 14, wherein each of the side gap portions includes a same material or substantially a same material as the dielectric layers.

17. The electronic component according to claim 14, wherein each of the side gap portions includes a plurality of layers.

18. The electronic component according to claim 17, wherein
the plurality of layers of each of the side gap portions include an inner layer and an outer layer; and
a thickness of the inner layer is less than a thickness of the outer layer.

19. The electronic component according to claim 14, wherein each of the side gap portions has a thickness of about 5 μm or more and about 12 μm or less.

* * * * *